US012359932B1

(12) United States Patent
Moon et al.

(10) Patent No.: US 12,359,932 B1
(45) Date of Patent: Jul. 15, 2025

(54) ESTABLISHING ROUTINES FOR AUTONOMOUS VEHICLE TRANSPORTATION SERVICES

(71) Applicant: Waymo LLC, Mountain View, CA (US)

(72) Inventors: Maria Moon, Mountain View, CA (US); Ryan Hendrickson, San Francisco, CA (US); Victor Chan, Mountain View, CA (US); Reed Morse, Millbrae, CA (US); Ricardo Gonzalez Ramirez, Sunnyvale, CA (US); Hans-olav CaveLie, Mountain View, CA (US); Kerry Brennan, Tempe, AZ (US); Bruce Mai, Sacramento, CA (US)

(73) Assignee: Waymo LLC, Mountain View, CA (US)

( * ) Notice: Subject to any disclaimer, the term of this patent is extended or adjusted under 35 U.S.C. 154(b) by 67 days.

(21) Appl. No.: 17/838,652

(22) Filed: Jun. 13, 2022

(51) Int. Cl.
*G01C 21/36* (2006.01)
*B60W 60/00* (2020.01)
*G06Q 10/02* (2012.01)
*G06Q 50/40* (2024.01)

(52) U.S. Cl.
CPC ... *G01C 21/3617* (2013.01); *B60W 60/00253* (2020.02); *G06Q 10/02* (2013.01); *G06Q 50/40* (2024.01); *B60W 2556/10* (2020.02)

(58) Field of Classification Search
CPC ........ G01C 21/3617; B60W 60/00253; B60W 2556/10; G06Q 10/02; G06Q 50/40
See application file for complete search history.

(56) References Cited

U.S. PATENT DOCUMENTS

| 11,248,920 | B1 | 2/2022 | Li | |
|---|---|---|---|---|
| 2005/0071078 | A1* | 3/2005 | Yamada | G01C 21/3484 701/410 |
| 2010/0268462 | A1* | 10/2010 | Tebbit | G01C 21/3644 342/451 |
| 2012/0041675 | A1* | 2/2012 | Juliver | G06Q 10/08 701/465 |
| 2014/0278086 | A1* | 9/2014 | San Filippo | G01C 21/3492 701/527 |
| 2014/0358411 | A1* | 12/2014 | Khoe | G01C 21/3661 701/117 |
| 2014/0358437 | A1* | 12/2014 | Fletcher | G01C 21/3484 701/533 |

(Continued)

*Primary Examiner* — Jason Holloway
*Assistant Examiner* — Madison B Emmett
(74) *Attorney, Agent, or Firm* — Botos Churchill IP Law

(57) ABSTRACT

Aspects of the disclosure relate to arranging trips for an autonomous vehicle transportation service. In one instance, a request for a first trip from a user is received. The trip may include a pickup location and a destination location. Whether the user has previously completed the first trip may be determined by comparing the pickup location and the destination location to a trip history for the user. Based on the determination, a notification suggesting that the user establish a routine may be provided for display to the user. Confirmation that the user wants to establish a routine based on the pickup location and the destination location may be received. The routine may be stored in memory for later use.

20 Claims, 15 Drawing Sheets

(56) References Cited

U.S. PATENT DOCUMENTS

| | | | | |
|---|---|---|---|---|
| 2016/0019785 | A1* | 1/2016 | Zhang | G08G 1/205 |
| | | | | 340/905 |
| 2016/0183068 | A1* | 6/2016 | Shen | G06Q 10/04 |
| | | | | 455/466 |
| 2018/0060827 | A1* | 3/2018 | Abbas | G08G 1/005 |
| 2018/0067620 | A1* | 3/2018 | Adler | G01C 21/3889 |
| 2019/0164088 | A1* | 5/2019 | Anastasia | G06Q 10/063112 |
| 2019/0205813 | A1* | 7/2019 | Sharma | G06F 16/951 |
| 2019/0272486 | A1* | 9/2019 | Lord | G06Q 50/40 |
| 2019/0295206 | A1* | 9/2019 | Yamashita | G06F 3/0485 |
| 2019/0360831 | A1* | 11/2019 | Liu | G05D 1/0221 |
| 2020/0205119 | A1* | 6/2020 | Seo | H04W 64/006 |
| 2021/0166192 | A1 | 6/2021 | Balva | |
| 2021/0304098 | A1* | 9/2021 | Yang | G01C 21/343 |
| 2021/0402892 | A1 | 12/2021 | Ali | |
| 2022/0068140 | A1* | 3/2022 | Brandon | G06Q 50/01 |

* cited by examiner

ESTABLISHING ROUTINES FOR AUTONOMOUS VEHICLE TRANSPORTATION SERVICES

BACKGROUND

Autonomous vehicles for instance, vehicles that may not require a human driver, can be used to aid in the transport of passengers or items from one location to another. Such vehicles may operate in a fully autonomous mode where passengers may provide some initial input, such as a pickup or destination location, and the autonomous vehicle maneuvers itself to that location. Autonomous vehicles are equipped with various types of sensors in order to detect objects in the surroundings. For example, autonomous vehicles may include sonar, radar, camera, lidar, and other devices that scan, generate and/or record data about the vehicle's surroundings in order to enable the autonomous vehicle to plan trajectories in order to maneuver itself through the surroundings.

Such autonomous vehicle may be used to provide transportation services to users. Such services may allow users to save favorite trips between two locations after a trip has been completed and then enable users to access those favorites in order to schedule a new trip.

BRIEF SUMMARY

Aspects of the disclosure provide a method of arranging trips for an autonomous vehicle transportation service. The method includes receiving, by one or more processors, a request for a first trip from a user, the trip comprising a pickup location and a destination location; determining, by the one or more processors, whether the user has previously completed the first trip by comparing the pickup location and the destination location to a trip history for the user; based on the determining, providing, by the one or more processors, for display to the user a notification suggesting that the user establish a routine; receiving, by the one or more processors, confirmation that the user wants to establish a routine based on the pickup location and the destination location; and generating and storing, by the one or more processors, the routine in memory for later use.

In one example, the method also includes receiving an intermediate destination for the first trip, and wherein the routine is established further based on the intermediate destination. In another example, the notification is provided to a client computing device from which the pickup location and destination location were received. In another example, the notification is provided to an autonomous vehicle for display. In this example, the notification is provided with a timing requirement defining when the notification is to be displayed during the first trip. In addition, the timing requirement indicates that the notification is to be displayed after the user is within the autonomous vehicle and indicates that the first trip can start. Alternatively, the timing requirement indicates that the notification is to be displayed when the autonomous vehicle is stopped. Alternatively, timing requirement indicates that the notification is to be displayed when the autonomous vehicle is stopped at a traffic light or stop sign. Alternatively, the timing requirement indicates that the notification is to be displayed when the autonomous vehicle is expected to be stopped for at least a predetermined period of time. Alternatively, the timing requirement indicates that the notification is to be displayed when the user engages with a display of the autonomous vehicle during the first trip.

In another example, the method also includes identifying a timing characteristic for the routine. In this example, identifying the timing characteristic is based on a current time when the pickup location and destination location are received as well as the trip history for the user. Alternatively, identifying the timing characteristic is based on user input at a client computing device or display of an autonomous vehicle. Alternatively, the method also includes, providing the routine for display to the user as a suggestion for a second trip based on the timing characteristic. In this example, the timing characteristic indicates a time of day for the routine.

In another example, the method also includes receiving, by one or more processors, a signal from a client computing device indicating that the user has accessed an application for the transportation service; in response to receiving the signal, accessing a plurality of routines stored with account information for the user in order to identify a set of routines including the routine; and providing the set of routines to the client computing device for display as a suggested trip. In this example, the method also includes, receiving confirmation that the user has selected the routine; and in response to receiving the confirmation, sending dispatching instructions to an autonomous vehicle in order to cause the autonomous vehicle to pick up the user at the pickup location and transport the user to the destination location.

Another aspect of the disclosure provides a system for arranging trips for an autonomous vehicle transportation service. The system includes one or more processors configured to: receive a request for a first trip from a user, the trip comprising a pickup location and a destination location; determine whether the user has previously completed the first trip by comparing the pickup location and the destination location to a trip history for the user; based on the determination, provide for display to the user a notification suggesting that the user establish a routine; receive confirmation that the user wants to establish a routine based on the pickup location and the destination location; and generate and store the routine in memory for later use.

In one example, the one or more processors are further configured to: receive a signal from a client computing device indicating that the user has accessed an application for the transportation service; in response to receiving the signal, access a plurality of routines stored with account information for the user in order to identify a set of routines including the routine; and provide the set of routines to the client computing device for display as a suggested trip. In this example, the one or more processors are further configured to: receive confirmation that the user has selected the routine; and in response to receiving the confirmation, send dispatching instructions to an autonomous vehicle in order to cause the autonomous vehicle to pick up the user at the pickup location and transport the user to the destination location.

DETAILED DESCRIPTION

Overview

Figure 1:
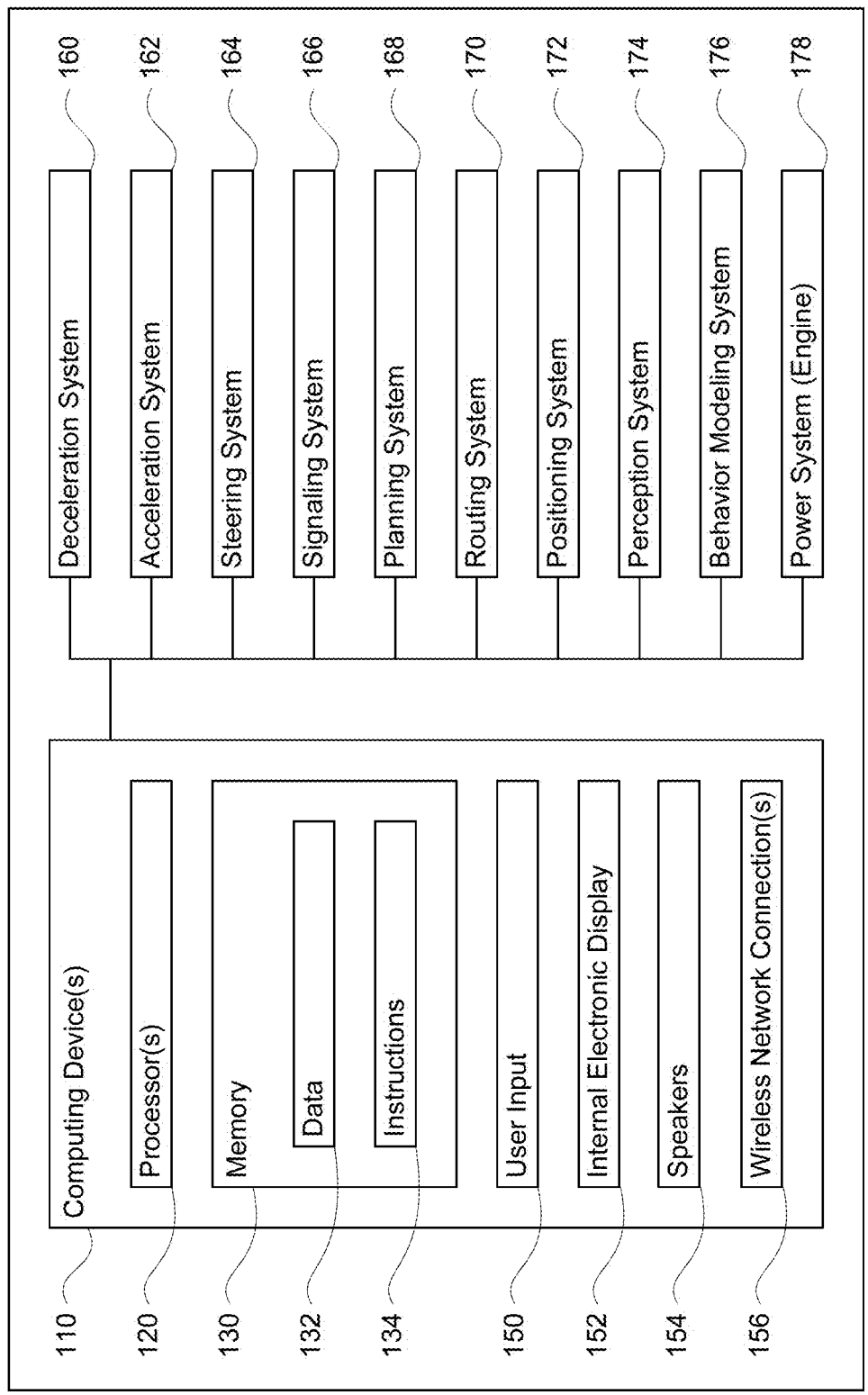
FIG. 1 is a functional diagram of an example vehicle in accordance with an exemplary embodiment.

The technology relates to enabling passengers to establish and save routine trips for an autonomous vehicle transportation service. Some transportation services may allow users to save favorite trips between two locations after a trip has been completed and then enable users to access those favorites in order to schedule a new trip. However, the features described herein better enable users of the transportation service to recognize, save and utilize routines including those involving intermediate destinations. This may result in a more user-friendly and appealing experience with the transportation service and encourage future ridership while also providing greater flexibility and convenience in carrying out routine trips that someone using a personal vehicle may enjoy.

A user may access an application on a client computing device in order to request a trip from a pickup location to a destination location. The user may also be provided with an option to add additional intermediate destinations (e.g., create a multi-stop trip). The pickup location, destination location, and any intermediate destinations may be provided to one or more server computing devices of the transportation service in order to arrange or schedule a trip.

The server computing devices may receive the pickup location, destination location, and any intermediate destinations and compare this information to the user's trip history information. In this regard, the server computing devices may store trip history information for each user of the transportation service. The trip history may identify what trips a user has taken in the past and when those trips were taken.

If the received pickup location, destination location, and any intermediate destinations correspond to a predetermined number of prior trips for the user, the server computing devices may provide a notification to the user's client computing device suggesting that the user establish a routine based on a trip. The predetermined number of trips may be one trip, two trips, or more. As an alternative, the notification and/or an option to save a trip as a routine may be provided each time the user sets up a new trip.

As noted above, the notification may suggest to the user that the user establish a routine. The routine may include the pickup location, the destination location, and any intermediate destinations. The user also may be provided with fields to input information such as a name for the routine and any locations of the routine. The inputted information may then be provided to the server computing devices and stored with the user's trip history as a routine.

In addition to or as an alternative to providing the notification for display to the user at the user's client computing device, the notification may be provided to the user during a trip, for instance, on an internal display of an autonomous vehicle. In this regard, when the server computing devices send dispatching instructions to the autonomous vehicle, the server computing devices may also provide a signal to the autonomous vehicle in order to cause the autonomous vehicle to display the notification.

As with the example of the client computing device, the user may be provided with fields to input information such as a name for the routine and any locations of the routine. The inputted information may then be provided to the server computing devices and stored with the user's trip history as a routine.

Once a routine has been established, when the user accesses the application, for instance to request a new trip, the application may send a signal to the server computing devices. In response, the server computing devices may access the user's account information and send a set of one or more routines for display to the user. This may allow the user to select one of the routines in order to request that the server computing devices set up a new trip based on the routine. Once a user has selected a routine, the server computing devices may then arrange a trip according to the routine. This may include selecting an autonomous vehicle for the trip and sending dispatching instructions to the autonomous vehicle.

The features described herein may enable users of an autonomous vehicle transportation service to recognize, save and utilize routines including those involving intermediate destinations. This may result in a more user-friendly, efficient (i.e., saving time and effort to arrange trips), and appealing experience with the transportation service and encourage future ridership while also providing greater flexibility and convenience in carrying out routine trips that someone using a personal vehicle may enjoy. These features may further increase accessibility for individuals for whom complex interactions with a mobile device and/or application are a challenge (whether due to disability, age, or another reason) as such users may benefit from only having to invest effort in setting up a routine trip once.

Example Systems

As shown in FIG. 1, an autonomous vehicle 100 in accordance with one aspect of the disclosure includes various components. Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. An autonomous vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each identified different levels to indicate how much, or how little, a vehicle controls the driving, although different organizations may categorize the levels differently. Moreover, such classifications may change (e.g., be updated) overtime.

As described herein, in a semi or partially autonomous driving mode, even though the vehicle assists with one or more driving operations (e.g., steering, braking and/or accelerating to perform lane centering, adaptive cruise control or emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

In contrast, in a fully autonomous driving mode, the control system of the vehicle performs all driving tasks and monitors the driving environment. This may be limited to certain situations such as operating in a particular service region or under certain time or environmental restrictions, or may encompass driving under all conditions without limitation. In a fully autonomous driving mode, a person is not expected to take over control of any driving operation.

Unless indicated otherwise, the architectures, components, systems and methods described herein can function in a semi or partially autonomous driving mode, or a fully-autonomous driving mode.

While certain aspects of the disclosure are particularly useful in connection with specific types of vehicles, the vehicle may be any type of vehicle including, but not limited to, cars, trucks (e.g., garbage trucks, tractor-trailers, pickup trucks, etc.), motorcycles, buses, recreational vehicles, street cleaning or sweeping vehicles, etc. The vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor 120. The memory 130 may be of any type capable of storing information accessible by the processor, including a computing device or computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs or GPUs. Alternatively, the one or more processors may include a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more of a button, mouse, keyboard, touch screen and/or microphone), various electronic displays (e.g., a monitor having a screen or any other electrical device that is operable to display information), and speakers 154 to provide information to a passenger of the autonomous vehicle 100 or others as needed. For example, internal display 152 may be located within a cabin of autonomous vehicle 100 and may be used by computing devices 110 to provide information to passengers within the autonomous vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing devices 110 may be part of an autonomous control system for the autonomous vehicle 100 and may be capable of communicating with various components of the vehicle in order to control the vehicle in an autonomous driving mode. For example, returning to FIG. 1, computing devices 110 may be in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 in order to control the movement, speed, etc. of autonomous vehicle 100 in accordance with the instructions 134 of memory 130 in the autonomous driving mode.

As an example, computing devices 110 may interact with deceleration system 160 and acceleration system 162 in order to control the speed of the vehicle. Similarly, steering system 164 may be used by computing devices 110 in order to control the direction of autonomous vehicle 100. For example, if autonomous vehicle 100 is configured for use on a road, such as a car or truck, steering system 164 may include components to control the angle of wheels to turn the vehicle. Computing devices 110 may also use the signaling system 166 in order to signal the vehicle's intent to other drivers or vehicles, for example, by lighting turn signals or brake lights when needed.

Routing system 170 may be used by computing devices 110 in order to generate a route to a destination location using map information. Planning system 168 may be used by computing device 110 in order to generate short-term trajectories that allow the vehicle to follow routes generated by the routing system. In this regard, the planning system 168 and/or routing system 166 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device), pullover spots, vegetation, or other such objects and information.

Figure 2:
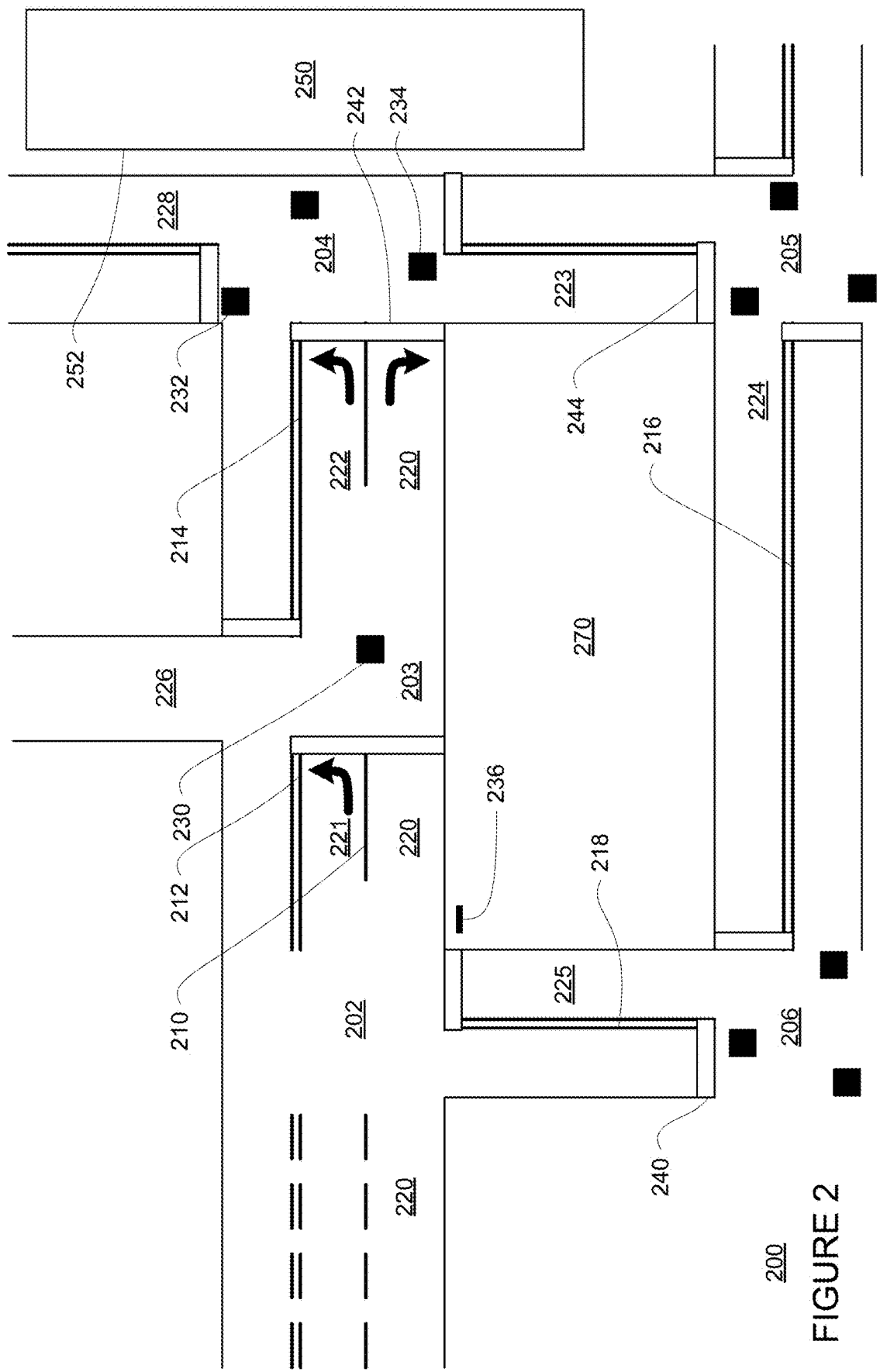
FIG. 2 is an example of map information in accordance with aspects of the disclosure.

FIGS. 2A and 2B is an example of map information 200 for a small section of roadway including intersection 202. FIG. 2A depicts a portion of the map information 200 that includes information identifying the shape, location, and other characteristics of lane markers or lane lines 210, 212, 214, 216, which define the boundaries of lanes, such as lanes 220, 222, 224, 226, 228. In this regard, some areas which may not necessarily be lanes (e.g., shoulder areas) may be identified as drivable areas (e.g., lanes). In this example, the map FIG. 2 is an example of map information 200 for a small section of roadway including intersections 202, 203, 204, 205, 206. FIG. 2 depicts a portion of the map information 200 that includes information identifying the shape, location, and other characteristics of lane markers or lane lines 210, 212, 214, 216, 218, lanes 220, 221, 222, 223, 224, 225, 226, 228, traffic control devices including traffic signal lights 230, 232, 234 and stop sign 236, stop lines 240, 242, 244, as well as a non-drivable area 270. In this example, lane 221 approaching intersection 204 is a left turn only lane, lane 222 approaching intersection 206 is a left turn only lane, and lane 226 is a one-way street where the direction of traffic moves away from intersection 204.

Figure 9:
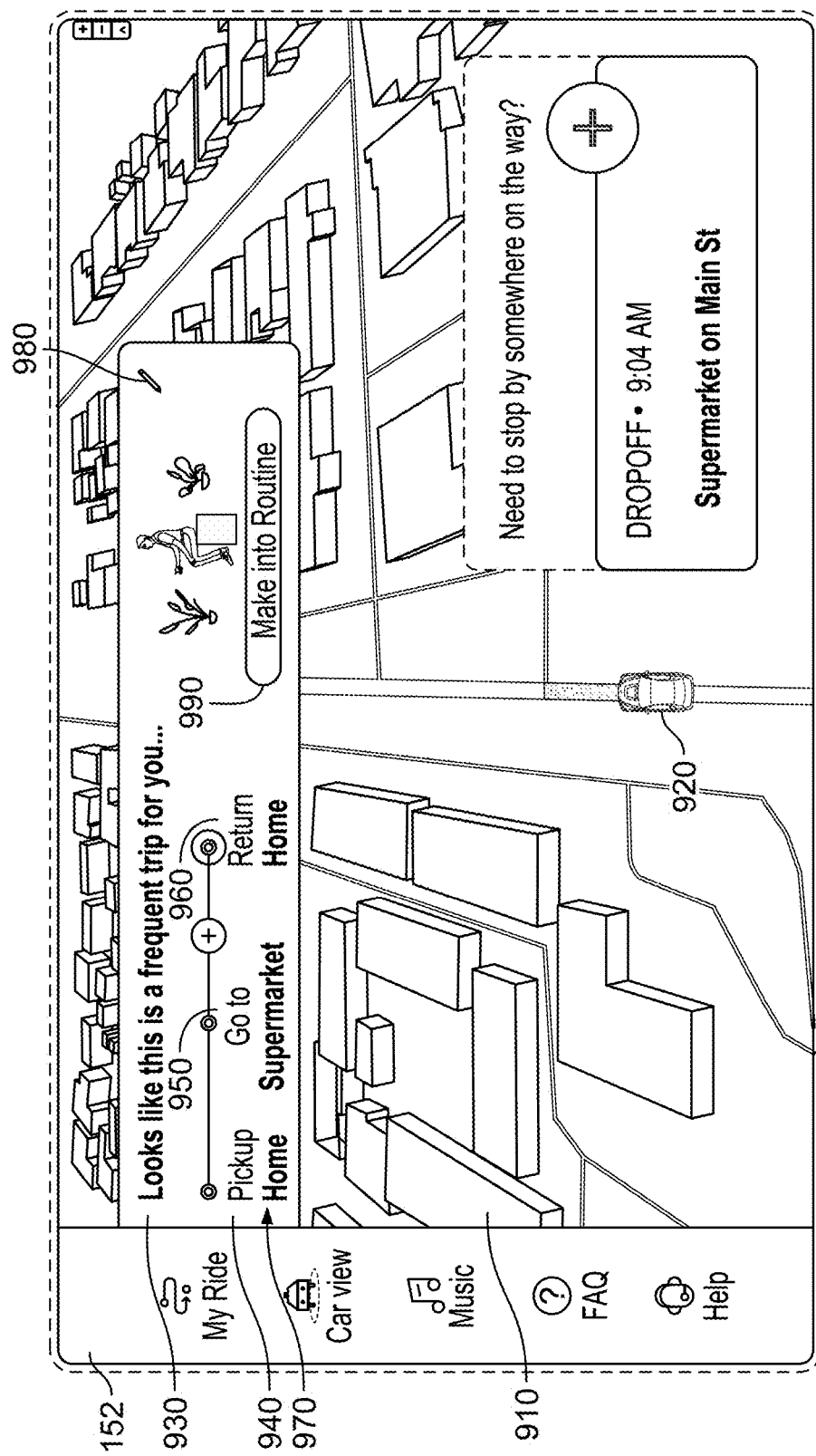
FIG. 9 is an example of a display and a screen shot in accordance with aspects of the disclosure.
Figure 10:
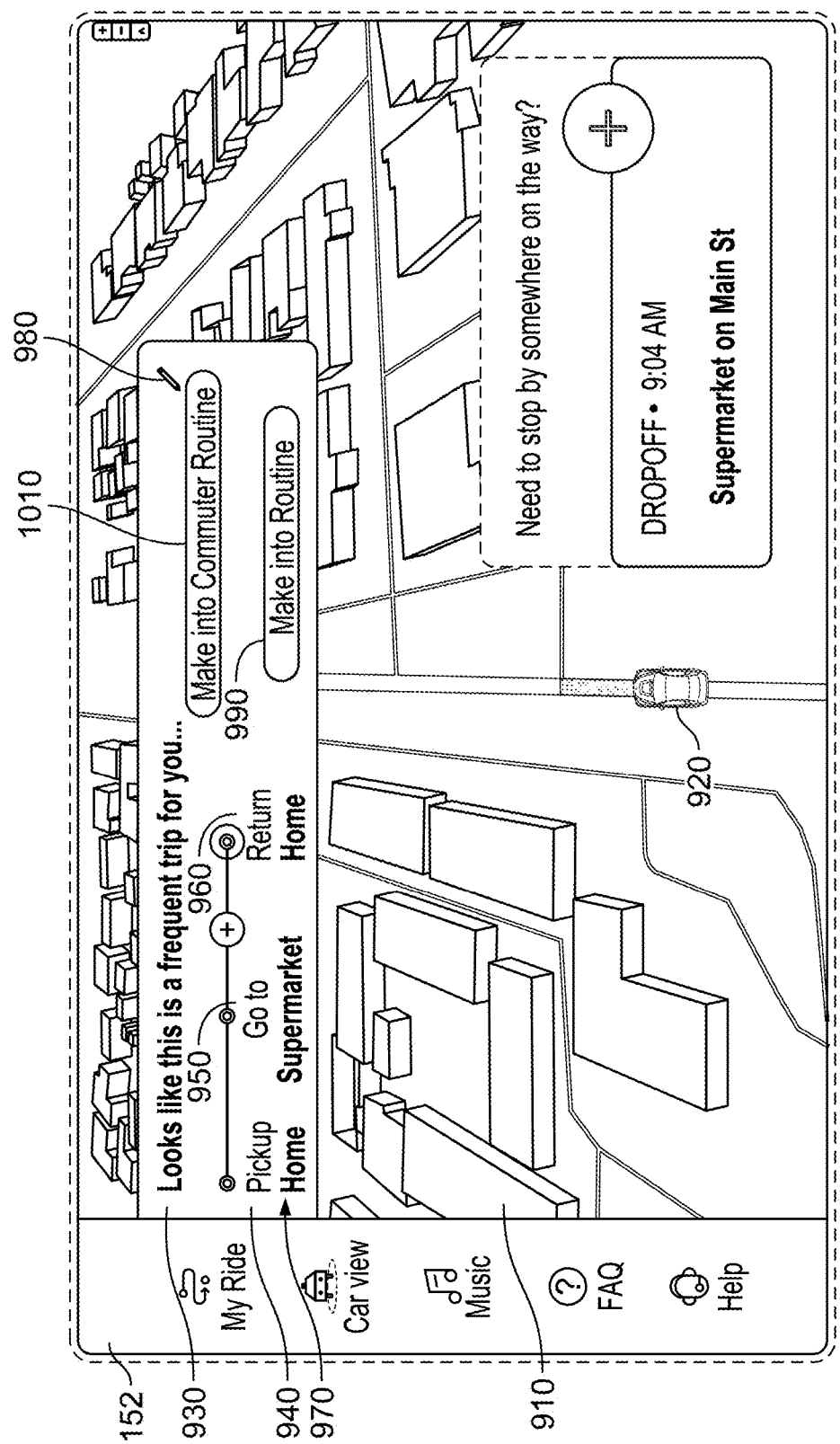
FIG. 10 is an example of a display and a screen shot in accordance with aspects of the disclosure.

In this example, the map information 200 also identifies a footprint 252 of a building 250. Although shown in two dimensions, the footprint may also be a three-dimensional area occupied by the building. This may also be associated with additional information identifying a classification or type of the building and/or a number of stories, floors or levels which may be used by the computing devices 110 to render map information including objects corresponding to such buildings for display to a user, for example, as depicted in FIGS. 9 and 10.

In addition to the aforementioned features and information, the map information may also include information that identifies the direction of traffic for each lane as well as information that allows the computing devices 110 to determine whether the vehicle has the right of way to complete a particular maneuver (i.e., complete a turn or cross a lane of traffic or intersection).

The map information may be configured as a roadgraph. The roadgraph may include a plurality of graph nodes and edges representing features such as crosswalks, traffic lights, road signs, road or lane segments, etc., that together make up the road network of the map information. Each edge is defined by a starting graph node having a specific geographic location (e.g., latitude, longitude, altitude, etc.), an ending graph node having a specific geographic location (e.g., latitude, longitude, altitude, etc.), and a direction. This direction may refer to a direction the autonomous vehicle 100 must be moving in in order to follow the edge (i.e., a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same driving lane or changing driving lanes. Each node and edge may have a unique identifier, such as a specific code, map location, or a latitude and longitude location of the node or starting and ending locations or nodes of an edge. In addition to nodes and edges, the map may identify additional information such as types of maneuvers required at different edges as well as which lanes are drivable.

The routing system 166 may use the aforementioned map information to determine a route from a current location (e.g., a location of a current node) to a destination location. Routes may be generated using a cost-based analysis which attempts to select a route to the destination location with the lowest cost. Costs may be assessed in any number of ways such as time to the destination location, distance traveled (each edge may be associated with a cost to traverse that edge), types of maneuvers required, convenience to passengers or the vehicle, etc. Each route may include a list of a plurality of nodes and edges which the vehicle can use to reach the destination location. Routes may be recomputed, as discussed further below, periodically as the vehicle travels to the destination location.

The map information used for routing may be the same or a different map as that used for planning trajectories. For example, the map information used for planning routes not only requires information on individual driving lanes, but also the nature of driving and bicycle lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g., because it is faster) and therefore be preferable.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it, which can often be determined with less noise than the absolute geographical location.

The positioning system 172 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 174 also includes one or more components for detecting objects external to the vehicle such as other road users (vehicles, pedestrians, bicyclists, etc.) obstacles in the roadway, traffic signals, signs, trees, buildings, etc. For example, the perception system 174 may include Lidars, sonar, radar, cameras, microphones and/or any other detection devices that generate and/or record data which may be processed by the computing devices of computing devices 110. In the case where the vehicle is a passenger vehicle such as a minivan or car, the vehicle may include Lidar, cameras, and/or other sensors mounted on or near the roof, fenders, bumpers or other convenient locations.

Figure 3A:
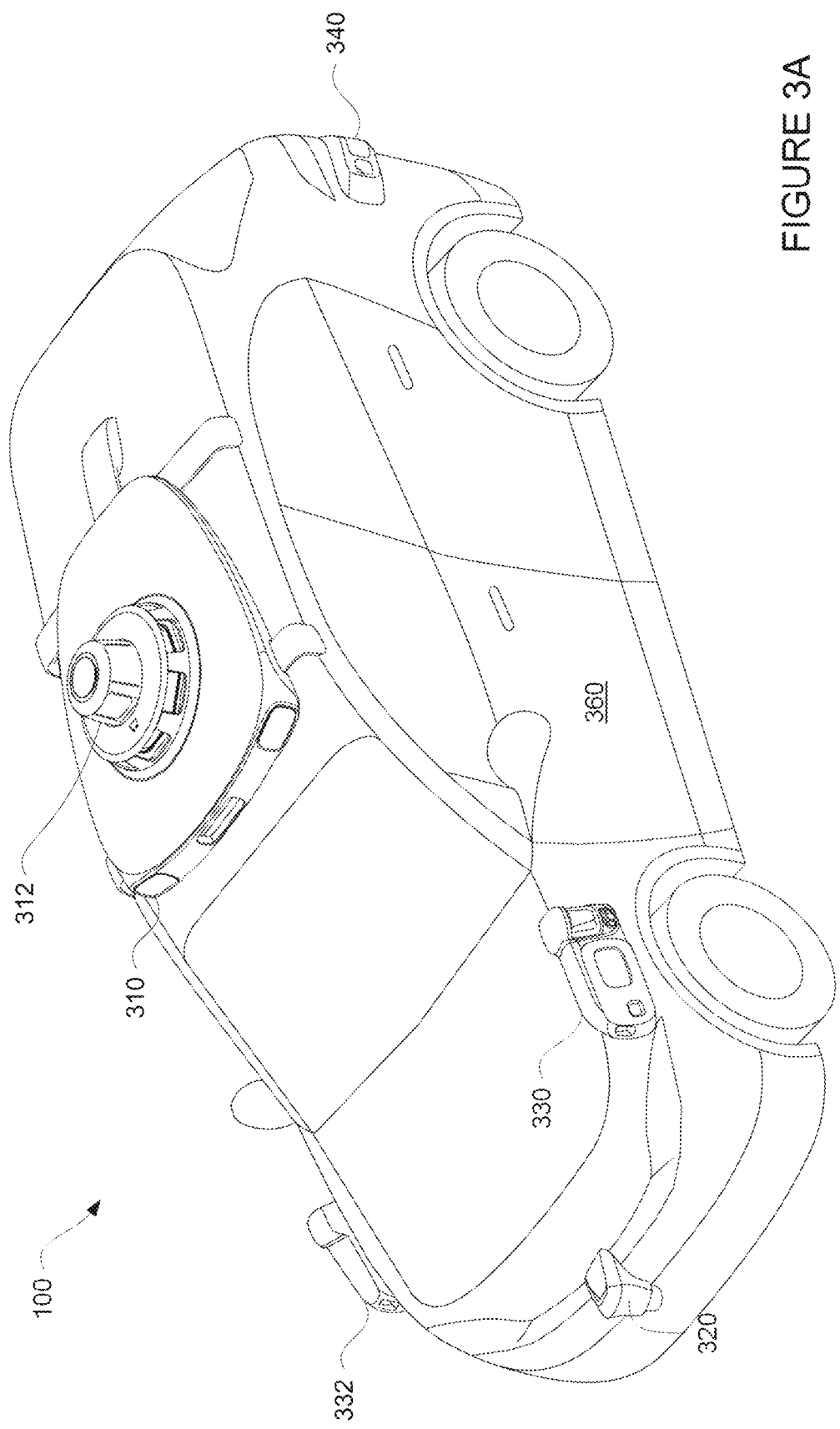
FIG. 3A-3B are example external views of a vehicle in accordance with aspects of the disclosure.
Figure 3B:
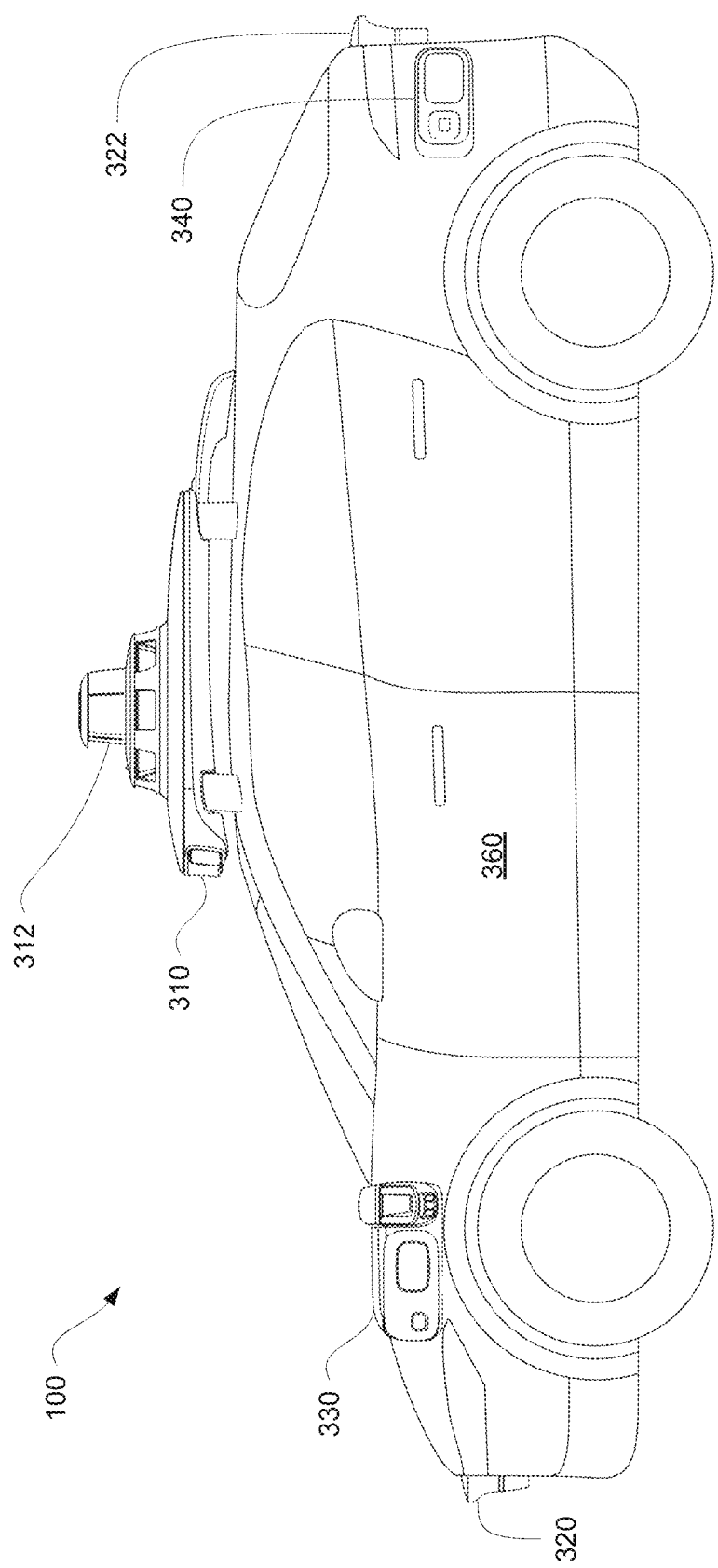

For instance, FIGS. 3A-3C are an example external views of autonomous vehicle 100. In this example, the roof of the autonomous vehicle includes a rooftop housing 310 and upper housing 312 may include a Lidar sensor as well as various cameras and radar units. Upper housing 312 may include any number of different shapes, such as domes, cylinders, "cake-top" shapes, etc. In addition, housing 320, 322 (shown in FIG. 3B) located at the front and rear ends of autonomous vehicle 100 and housings 330, 332 on the driver's and passenger's sides of the vehicle may each store a Lidar sensor and, in some instances, one or more cameras. For example, housing 330 is located in front of driver door 360. Autonomous vehicle 100 also includes a housing 340 for radar units and/or cameras located on the driver's side of the autonomous vehicle 100 proximate to the rear fender and rear bumper of autonomous vehicle 100. Another corresponding housing (not shown may also be arranged at the corresponding location on the passenger's side of the autonomous vehicle 100. Additional radar units and cameras (not shown) may be located at the front and rear ends of autonomous vehicle 100 and/or on other positions along the roof or rooftop housing 310.

Computing devices 110 may be capable of communicating with various components of the vehicle in order to control the movement of autonomous vehicle 100 according to primary vehicle control code of memory of computing devices 110. For example, returning to FIG. 1, computing devices 110 may include various computing devices in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 (i.e. the vehicle's engine or motor) in order to control the movement, speed, etc. of autonomous vehicle 100 in accordance with the instructions 134 of memory 130.

The various systems of the vehicle may function using autonomous vehicle control software in order to determine how to control the vehicle. As an example, a perception system software module of the perception system 174 may use sensor data generated by one or more sensors of an autonomous vehicle, such as cameras, Lidar sensors, radar units, sonar units, etc., to detect and identify objects and their characteristics. These characteristics may include location, type, heading, orientation, speed, acceleration, change in acceleration, size, shape, etc.

In some instances, characteristics may be input into a behavior prediction system software module of the behavior modeling system 176 which uses various behavior models based on object type to output one or more behavior predictions or predicted trajectories for a detected object to follow into the future (e.g., future behavior predictions or predicted future trajectories). In this regard, different models may be used for different types of objects, such as pedestrians, bicyclists, vehicles, etc. The behavior predictions or predicted trajectories may be a list of positions and orientations or headings (e.g., poses) as well as other predicted characteristics such as speed, acceleration or deceleration, rate of change of acceleration or deceleration, etc.

In other instances, the characteristics from the perception system 174 may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle.

Detected objects, predicted trajectories, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168. The planning system 168 may use this input to generate planned trajectories for the vehicle to follow for some brief period of time into the future based on a route generated by a routing module of the routing system 170. Each planned trajectory may provide a planned path and other instructions for an autonomous vehicle to follow for some brief period of time into the future, such as 10 seconds or more or less. In this regard, the trajectories may define the specific characteristics of acceleration, deceleration, speed, direction, etc. to allow the vehicle to follow the route towards reaching a destination location. A control system software module of computing devices 110 may be configured to control movement of the vehicle, for instance by controlling braking, acceleration and steering of the vehicle, in order to follow a trajectory.

The computing devices 110 may control the vehicle in one or more of the autonomous driving modes by controlling various components. For instance, by way of example, computing devices 110 may navigate the vehicle to a destination location completely autonomously using data from the detailed map information and planning system 168. Computing devices 110 may use the positioning system 170 to determine the vehicle's location and perception system 174 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of autonomous vehicle 100 by steering system 164), and signal such changes (e.g., by lighting turn signals) using the signaling system 166. Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
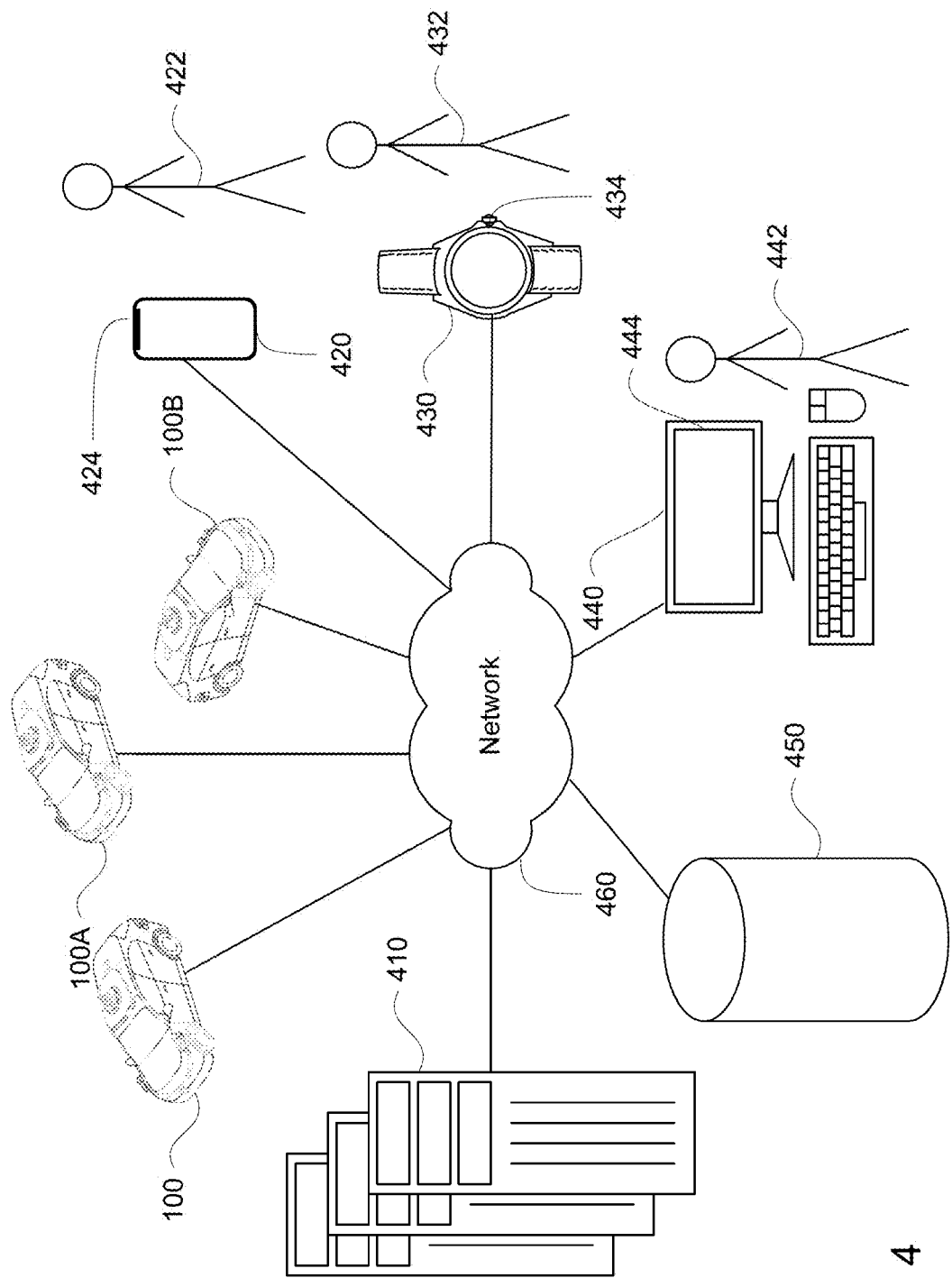
FIG. 4 is a pictorial diagram of an example system in accordance with aspects of the disclosure.
Figure 5:
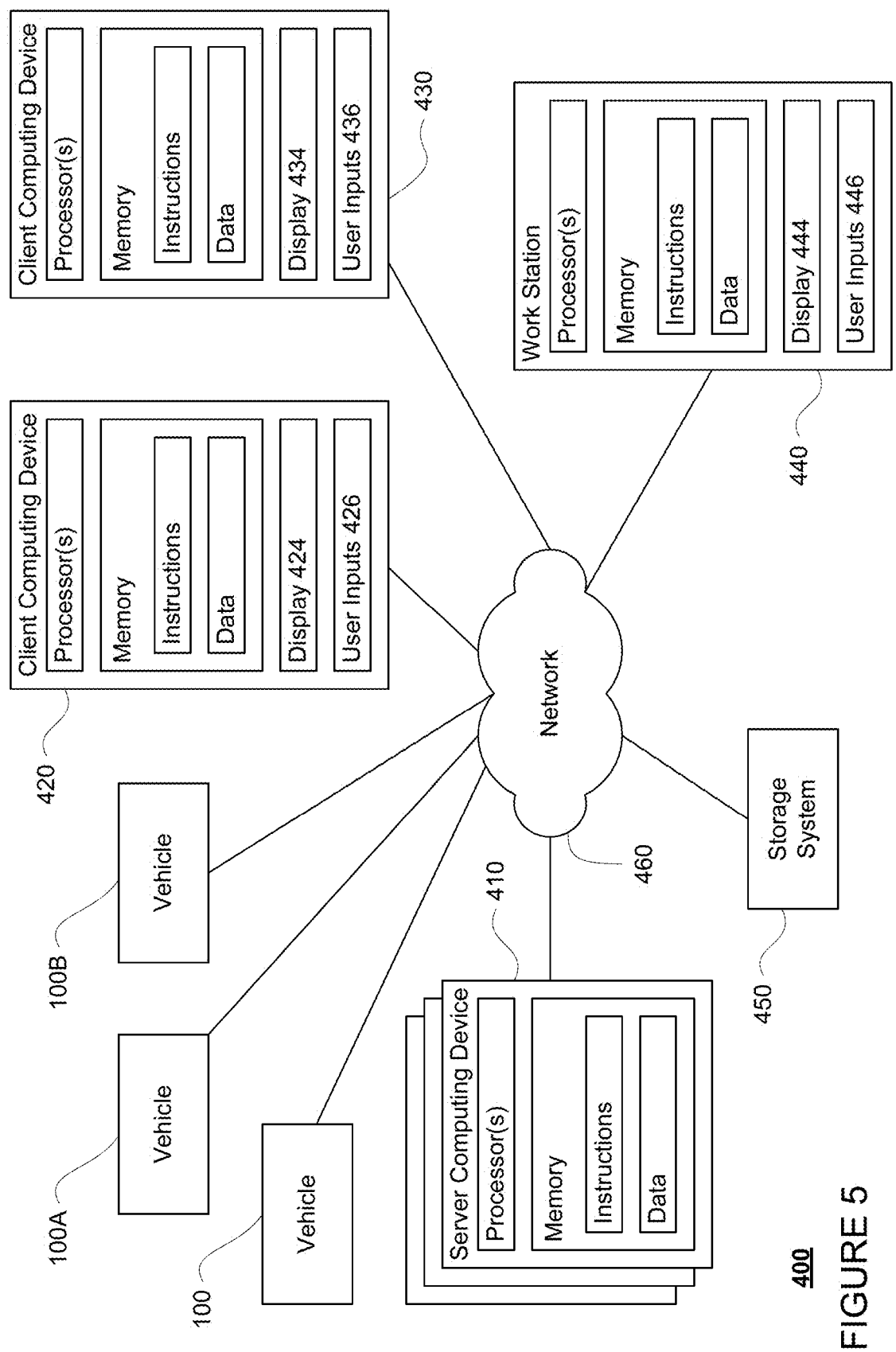
FIG. 5 is a functional diagram of the system of FIG. 4 in accordance with aspects of the disclosure.

Computing device 110 of autonomous vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes autonomous vehicle 100A and autonomous vehicle 100B, which may be configured the same as or similarly to autonomous vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening graph nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of autonomous vehicle 100 or a similar computing device of autonomous vehicle 100A or autonomous vehicle 100B as well as computing devices 420, 430, 440 via the network 460. For example, autonomous vehicles 100, 100A, 100B, may be a part of a fleet of vehicles that can be dispatched by server computing devices to various locations. In this regard, the server computing devices 410 may function as a scheduling system which can be used to arrange trips for passengers by assigning and dispatching vehicles such as autonomous vehicles 100, 100A, 100B. These assignments may include scheduling trips to different locations in order to pick up and drop off those passengers. In this regard, the server computing devices 410 may operate using scheduling system software in order to manage the aforementioned autonomous vehicle scheduling and dispatching. In addition, the computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430 may be a personal computing device intended for use by a user 422, 432 and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, such as a wristwatch as shown in FIG. 3. As an example, the user may input information using a small keyboard, a keypad, microphone, using visual signals with a camera, or a touch screen. As yet another example, client computing device 440 may be a desktop computing system including a keyboard, mouse, camera and other input devices.

In some examples, client computing device 420 may be a mobile phone used by a passenger of an autonomous vehicle. In other words, user 422 may represent a passenger or a scheduler as discussed herein. In addition, client computing device 430 may represent a smart watch for a passenger of an autonomous vehicle. In other words, user 432 may represent a passenger or a scheduler as discussed herein. The client computing device 440 may represent a workstation for an operations person, for example, a remote assistance operator or other operations personnel who may provide remote assistance to an autonomous vehicle and/or a passenger. In other words, user 442 may represent an operator (e.g., operations person) of a transportation service utilizing the autonomous vehicles 100, 100A, 100B. Although only a few passengers, schedulers and operations persons are shown in FIGS. 4 and 5, any number of such passengers and remote assistance operators (as well as their respective client computing devices) may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 3 and 4, and/or may be directly connected to or incorporated into any of computing devices 110, 410, 420, 430, 440, etc.

The storage system 450 may store various map information which may be the same or similar to the map information 200 described above. The map information may also include information that the server computing devices 410 can provide to client computing devices in order to display maps to users as discussed further below.

The storage system 450 may also store user account information. The account information may include credentials (e.g., a username and password as in the case of a traditional single-factor authentication as well as other types of credentials typically used in multi-factor authentications such as random identifiers, biometrics, etc.) that can be used to identify a user and/or the user's client computing device to the one or more server computing devices. In addition, account information may also include personal information such as the user's name, contact information, identifying information of the user's client computing device (or devices if multiple devices are used with the same user account), as well as trip data (e.g., scheduled, current and historical trip data) for the user. This historical trip data may include information and statistics about trips including information scheduling trips, dates, times, pickup and drop off locations, as well as more specific details about pickups and drop offs as well. In other words, the historical trip data may include a user's trip history which identifies what trips (e.g., pickup locations, destination locations, and any intermediate destinations) a user has taken in the past and when those trips were taken (e.g., pickup time, drop off time, day of the week, etc.).

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 14:
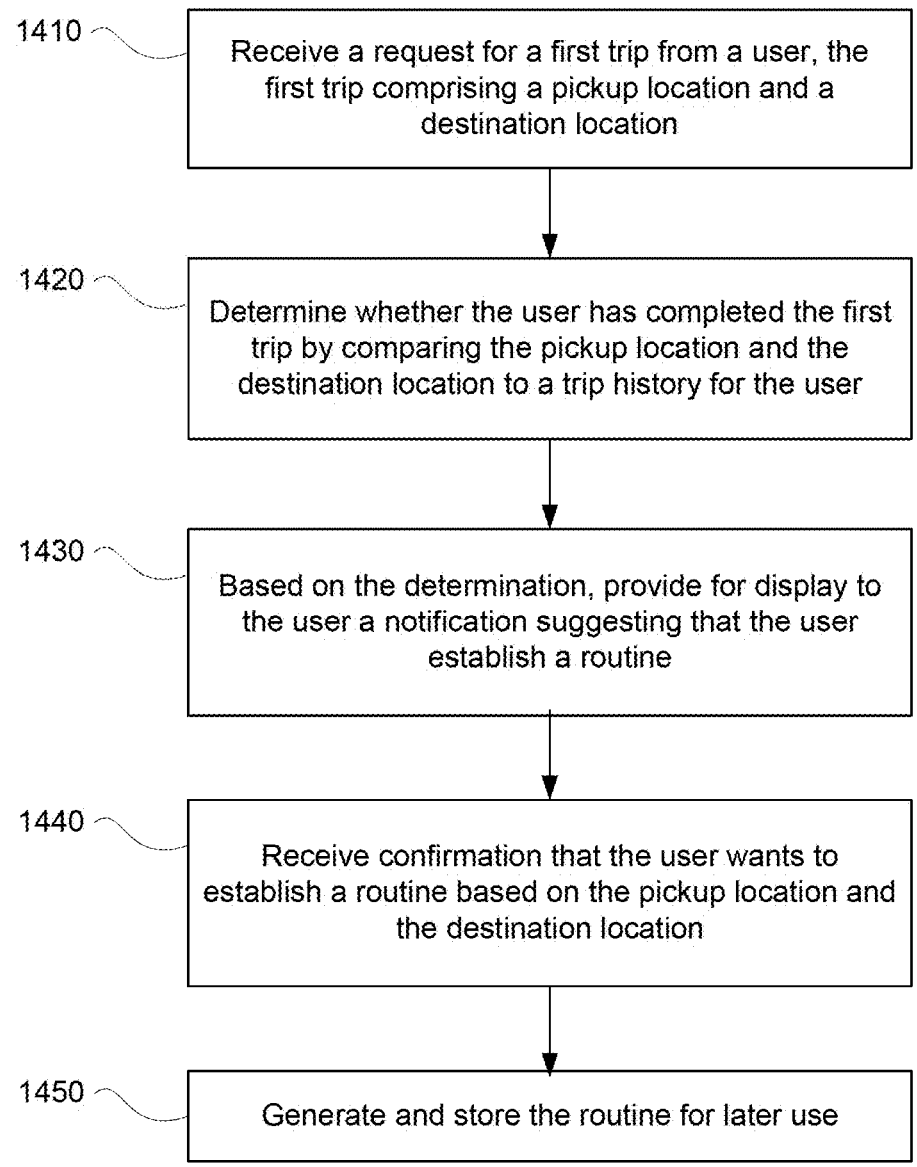
FIG. 14 is an example flow diagram in accordance with aspects of the disclosure.

FIG. 14 provides an example flow diagram 1400 for arranging trips for an autonomous vehicle transportation service, which may be performed by one or more processors, such as the one or more processors of the server computing devices 410. As shown in block 1410, a request for a first trip is received from a user. The trip includes a pickup location and a destination location.

A user may access an application on a client computing device in order to request a trip from a pickup location to a destination location. The user may also be provided with an option to add additional intermediate destinations (e.g., create a multi-stop trip). The pickup location, destination location, and any intermediate destinations may be provided to one or more server computing devices 410 in order to arrange or schedule a trip.

In order to do so, a user may download an application for requesting a vehicle to a client computing device. For example, users 422 and 432 may download the application via a link in an email, directly from a website, or an application store to client computing devices 420 and 430. For example, a client computing device may transmit a request for the application over the network 460, for example, to one or more server computing devices 410, and in response, receive the application. The application may then be installed locally at the client computing device.

To arrange a trip, a user, such as user 422, may first use a client computing device, such as client computing device 420, to arrange a trip. For instance, the user 422 may access an application of the transportation service and view an option to arrange a trip. The user may also specify or otherwise provide a pickup location at which a vehicle can pick up the vehicle. In response, the client computing device 420 may send a request to a server computing device identifying at least a pickup location (e.g., a current location of the client computing device) and in some instances a different drop off destination.

As an example, a pickup location can be selected by defaulting to a current location of the passenger's client computing device, but may also be a recent, suggested, or saved location near the current location associated with the user's account. The user may enter an address or other location information, tap a location on a map or select a location from a list in order to identify a pickup location. For instance, the client computing device 420 by way of the application may send its current location, such as a GPS location, and/or a name, address or other identifier for the pickup location to the one or more server computing devices 410 via network 460. In this regard, the user may share his or her current location (or other information such as accelerometer or gyroscope information generated by such devices at the client computing device) with the server computing devices 410 when using the application and/or requesting a vehicle for a trip.

The user may also select or specify one or more intermediate destinations as well as a final drop off or destination location in a similar manner. For example, an intermediate or destination location be a recent, suggested, or saved location near the current location associated with the user's account. The user may enter an address or other location information, tap a location on a map or select a location from a list in order to identify a pickup location.

Figure 6:
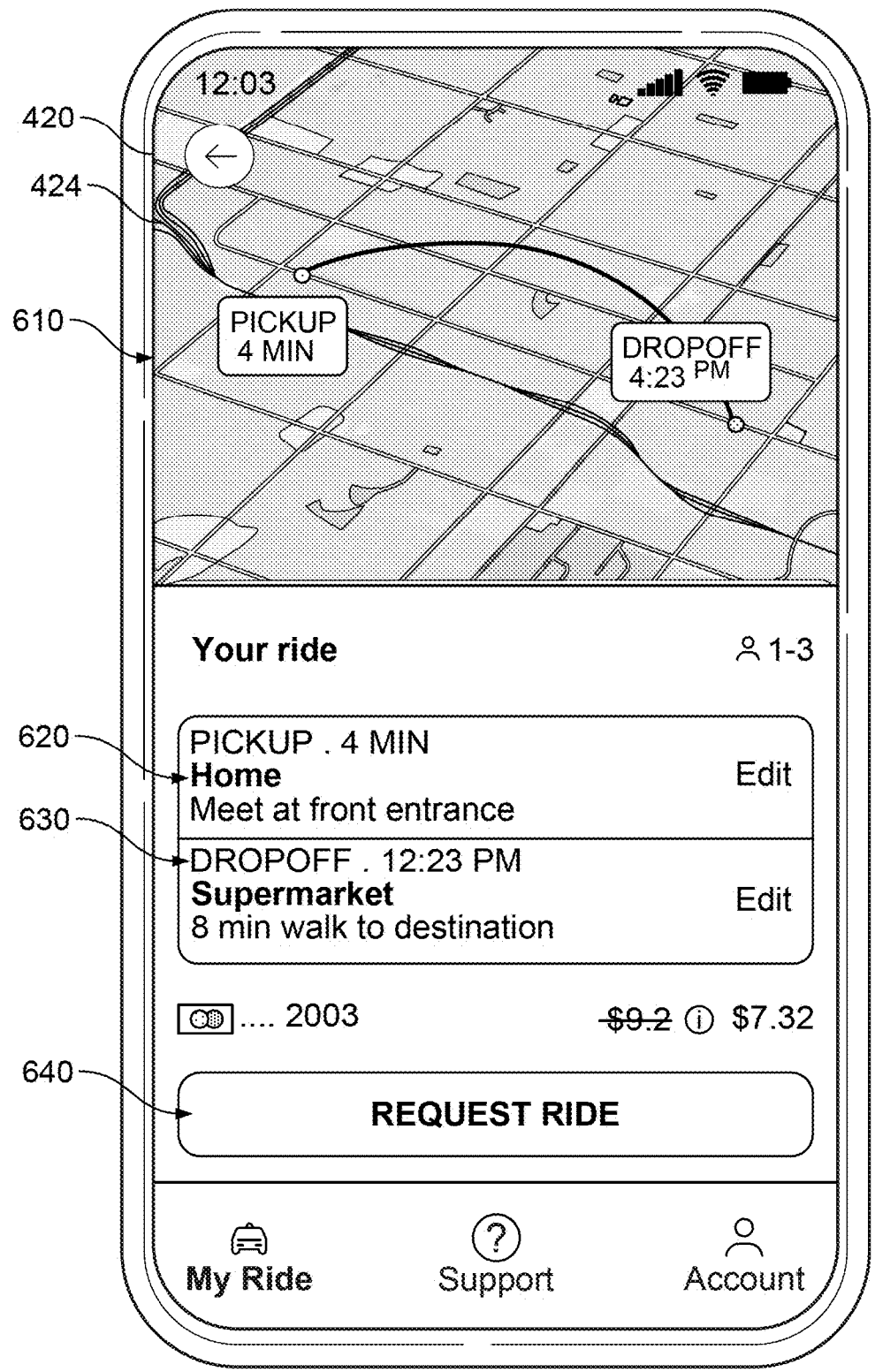
FIG. 6 is an example of a client computing device and a screen shot in accordance with aspects of the disclosure.

The user may confirm any selections and thereafter, the application may provide the user's selected pickup location, final destination location, and any intermediate destination locations to the server computing devices 410. For example, FIG. 6 is an example of client computing device 420 and a screen shot including a map 610 depicting a representation of a pickup location 620 and a destination location 630. The screen shot also includes details of the pickup location 620 and destination location 630 including names (e.g., "Home" and "Supermarket", estimated times of arrival for the vehicle (e.g., pickup in 4 minutes and drop off time of 12:23), as well as other information such as walking time from an expected drop off location to the user's final destination (e.g., 8-minute walk to destination). The user is also provided with an option 640 to confirm the trip (e.g., a "REQUEST RIDE" button). Once the user selects this option, the application may provide the user's selected pickup location, final destination location, and any intermediate destination locations to the server computing devices 410. Note that there are no intermediate destination locations depicted in this example, but such locations may also be included as well.

Returning to FIG. 14, at block 1420, whether the user has previously completed the first trip by comparing the pickup location and the destination location to a trip history for the user may be determined. The server computing devices 410 may receive the pickup location, destination location, and any intermediate destinations and compare this information to the user's trip history information. Thereafter, at block 1430, a notification suggesting that the user establish a routine is provided for display to the user based on the determination.

If the received pickup location, destination location, and any intermediate destinations correspond to a predetermined number of prior trips for the user, the server computing devices may provide a notification to the user's client computing device suggesting that the user establish a routine based on a trip. For example, in response to the user confirming the trip, the server computing devices 410 may compare the received selected pickup location, final destination location, and any intermediate destination locations to the user's trip history. If the user has taken the same trip in the past at least the predetermined number of times, the server computing devices 410 may send a signal to the client computing device 410 in order to cause the client computing device to provide a notification to the user suggesting that the user establish a routine for the trip.

Figure 7:
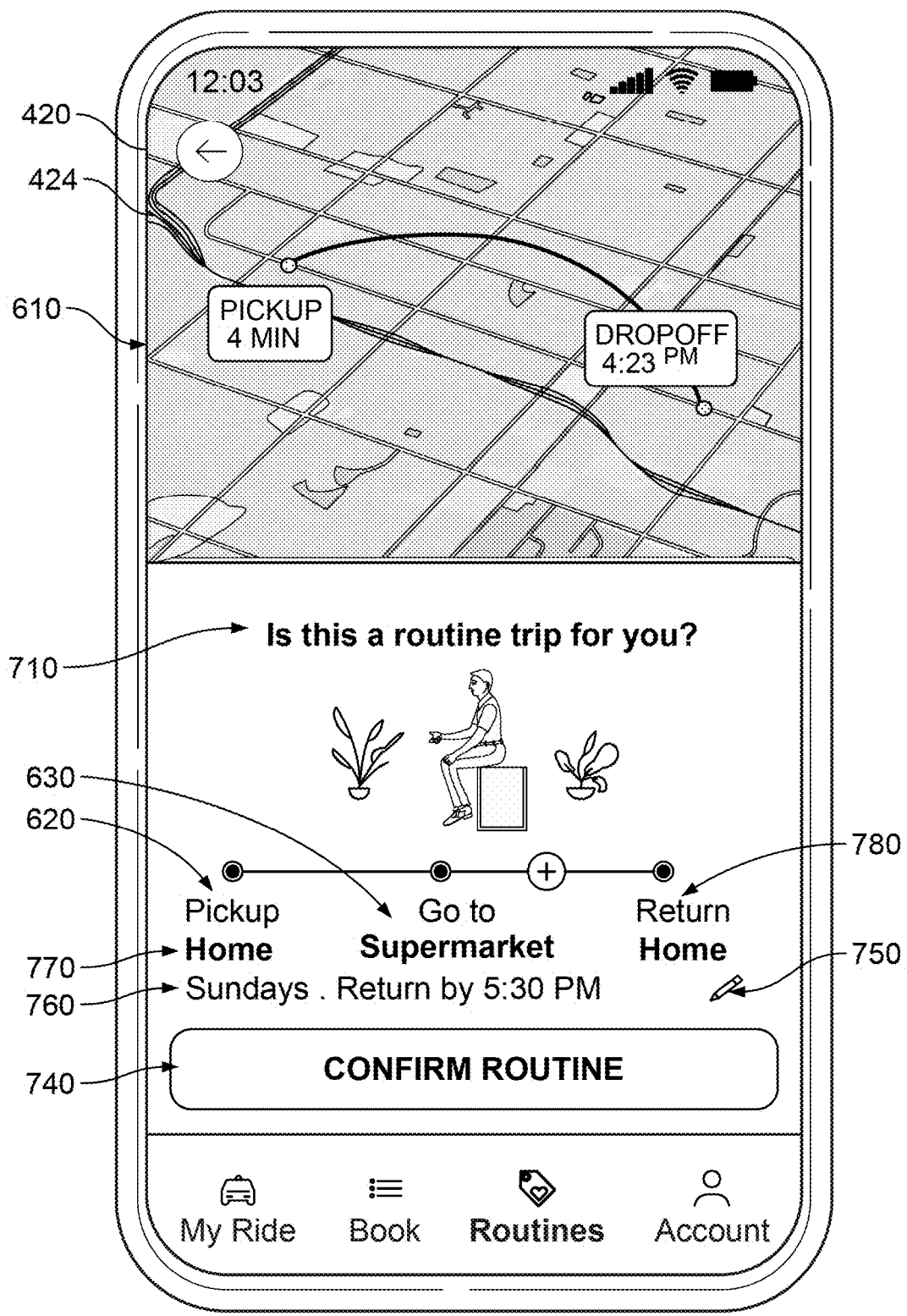
FIG. 7 is an example of a client computing device and a screen shot in accordance with aspects of the disclosure.

For example, FIG. 7 is an example of client computing device 420 and a screen shot including the map 610 depicting a representation of the pickup location 620 and the destination location 630. The screen shot also includes a notification 710 asking if the user would like to make the trip a routine or a routine trip. The notification provides some details on the routine including the pickup location 620, destination location 630 (here an intermediate destination location), and a final destination location 780 (here the same as the pickup location 620). Thus, in this example, the trip is a multi-stop trip.

The predetermined number of trips may be one trip, two trips, or more. For example, if the pickup location, destination location, and any intermediate destinations are the same or within some predetermined distance (e.g., each of the received locations is within 100 meters or more or less of the locations of a prior trip), these may be considered corresponding locations.

As an alternative, the notification and/or an option to save a trip as a routine may be provided each time the user sets up a new trip. However, always suggesting that a user save a routine for each trip may be less useful to the user and potentially even discourage users from saving routines because users may tend to ignore or skip over the notification by habit.

Figure 8:
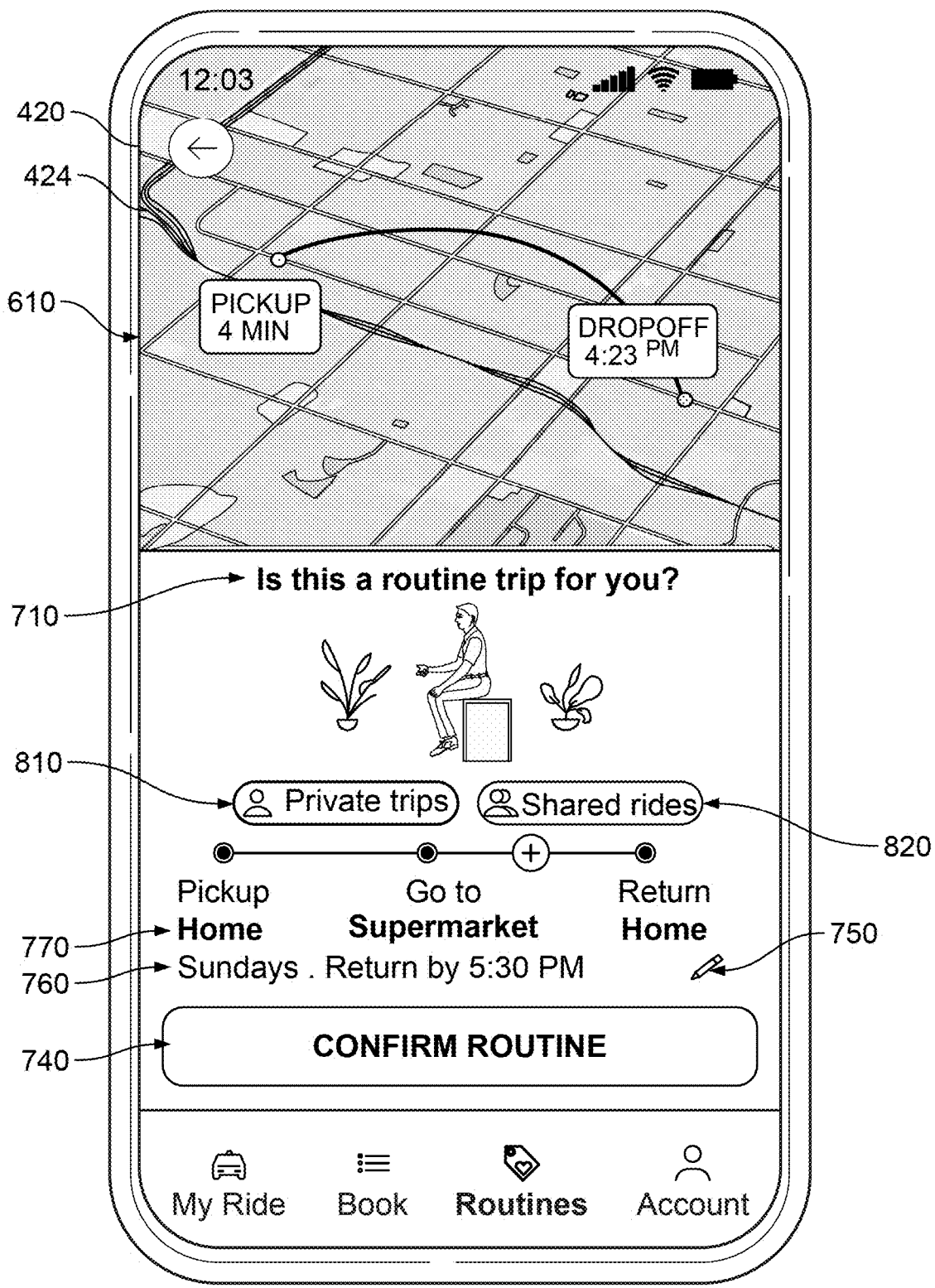
FIG. 8 is an example of a client computing device and a screen shot in accordance with aspects of the disclosure.

As noted above, the notification may suggest to the user that the user establish a routine. A routine may include the pickup location, the destination location, and any intermediate destinations. The user also may be provided with fields to input information (e.g., user input) such as a name for the routine and any locations of the routine. In addition, or alternatively, the user may indicate a suggested time characteristic for the routine (e.g., weekday mornings, weekend mornings, weekday evenings, etc.). The user may also be able to identify whether the user is willing to ride with other users (e.g., ridesharing). Returning to FIG. 7, the user may edit the names 770 (here, "Home", "Supermarket", "Home") as well as the timing characteristic 760 (here, "Sundays" and "Return by 5:30 pm") by selecting the pencil or edit option 750. FIG. 8 provides additional options 810, 820 to allow the user to select whether or not the routine is to include only private trips via option 810 or shared rides via option 820. In this way, the user may select to allow for ridesharing by selecting option 820 or not allow for ridesharing by selecting option 810.

The inputted information may then be provided to the server computing devices and stored with the user's trip history as a routine. Once the user is satisfied with the inputted information, the user may select the option 740 to confirm the routine. In response, the application (via the processors of the client computing device 420) may send the pickup location, the destination location, and any intermediate destinations to the server computing devices 410. The application may also send additional information such as names for the routine and any locations of the routine as well as any time characteristics for the routine (e.g., weekday mornings, weekend mornings, weekday evenings, etc.) and whether the user is willing to ride with other users (e.g., ridesharing).

As an alternative, the server computing devices may infer a time characteristic based on the time for which the user has requested the trip (i.e., right now) as well as the timing of any corresponding prior trips from the user's trip history.

In addition to or as an alternative to providing the notification for display to the user at the user's client computing device, the notification may be provided to the user during a trip, for instance, on an internal display of an autonomous vehicle. In this regard, when the server computing devices send dispatching instructions to the autonomous vehicle, the server computing devices may also provide a signal to the autonomous vehicle in order to cause the autonomous vehicle to display the notification. The notification may be displayed at an internal display of the autonomous vehicle, and like the example of the client computing device, the notification may suggest that the user establish a routine based on the current trip (i.e., the pickup location, destination location, and any intermediate destinations of the current trip).

For example, FIG. 9 is an example of internal display 152 and a screen shot including a map 910 depicting a representation 920 of the autonomous vehicle 100 during a trip. The screen shot also includes a notification 930 asking if the user would like to make the current trip a routine or a routine trip. The notification provides some details on the routine including the pickup location 940, destination location 950 (here an intermediate destination location), and a final destination location 960 (here the same as the pickup location 620). Thus, in this example, the trip is a multi-stop trip.

As with the example of the client computing device, the user may be provided with fields to input information such as a name for the routine and any locations of the routine. In addition, or alternatively, the user may indicate a suggested time characteristic for the routine (e.g., weekday mornings, weekend mornings, weekday evenings, etc.). The user may also be able to identify whether the user is willing to ride with other users (e.g., ridesharing). Returning to FIG. 9, the user may edit the names 970 (here, "Home", "Supermarket", "Home") by selecting the pencil or edit option 980. FIG. 10 provides an additional option 1010 to allow the user to select whether or not the routine is to include only private trips via option 990 or shared rides via option 1010 ("commuter routine"). In this way, the user may select to allow for ridesharing by selecting option 1010 or not allow for ridesharing by selecting option 990.

The inputted information may then be provided to the server computing devices and stored with the user's trip history as a routine. Once the user is satisfied with the inputted information, the user may select option 990 (or option 1010) to confirm the routine. In response, the computing devices 110 (via the processors of the computing devices 110) may send the pickup location, the destination location, and any intermediate destinations to the server computing devices 410. The computing devices 110 may also send additional information such as names for the routine and any locations of the routine as well as any time characteristics for the routine (e.g., weekday mornings, weekend mornings, weekday evenings, etc.) and whether the user is willing to ride with other users (e.g., ridesharing).

As an alternative, the server computing devices may infer a time characteristic based on the time for which the user has requested the trip (i.e., right now) as well as the timing of any corresponding prior trips from the user's trip history as described above.

In some instances, the signal may also indicate a timing requirement for displaying the notification. For example, this timing requirement may indicate when the notification is to be displayed, such as at the beginning of a trip (e.g., after the user has entered the autonomous vehicle and indicated that the trip can begin), the end of a trip (e.g., as the autonomous vehicle is pulling over or has stopped to allow the user to exit the autonomous vehicle), or at some point in between.

In other instances, the timing requirement may indicate that the notification is to be displayed at some point after the beginning of the trip when the user is engaging with the display (i.e., tapping on the display in order to change views or obtain more information about the trip) or with the application on the user's client computing device which may be in communication with the autonomous vehicle's computing devices or which may send a signal to the server computing devices which send the signal to the autonomous vehicle to display the notification on the display.

In some instances, displaying the notification at the end of a trip may make a user less likely to see the notification as the user may be more concerned with exiting the vehicle. In that regard, the autonomous vehicle's computing devices may monitor when the autonomous vehicle is in a certain situation where such a notification may be appropriate such as stopped at a stop sign (especially if there is a line of stacked vehicles waiting to reach the intersection), stopped at a traffic light, or in slow moving traffic. In some instances, the autonomous vehicle's computing devices may estimate an amount of time that the autonomous vehicle will be stopped at a traffic light and if greater than a predetermined amount (e.g., 5 seconds, 10 seconds or more or less), the computing devices may display the notification. This may make it more likely that the user is comfortable focusing on the display (in order to establish a routine) rather than the autonomous vehicle's driving environment.

As an alternative, the server computing devices may compare the locations to a user's trip history in order to identify trips that partially correspond. For example, two trips may partially correspond if they include the same pickup location and drop off locations but have at least one different intermediate destination. In such instances, the timing requirement may cause the autonomous vehicle's computing devices to display a notification as the autonomous vehicle passes or comes closest to at least one different intermediate destination (i.e., but is not stopping at that location on this trip). In such instances, the notification may not only suggest that the user establish a routine as described above, but may also suggest that the user add at least one different intermediate destination as an intermediate destination for the routine.

In some instances, the signal may further provide instructions for how often to display the notification. For example, the notification may be displayed until the user engages with the display (i.e., until the user opts to establish or decline to establish a routine), for a predetermined amount of time, and/or for only a predetermined number of times during a single trip (e.g., two times or more or less). This again may reduce the likelihood that the users may ignore or skip over the notification by habit.

Returning to FIG. 14, at block 1440, confirmation that the user wants to establish a routine based on the pickup location and the destination location is received. At block 1450, the routine is generated and stored in memory for later use. For instance, the server computing devices 410 may receive pickup location, the destination location, and any intermediate destinations from the user's client computing device or the computing devices 110 of an autonomous vehicle. In some instances, the server computing devices 410 may also receive additional information such as names for the routine and any locations of the routine as well as any time characteristics for the routine (e.g., weekday mornings, weekend mornings, weekday evenings, etc.) and whether the user is willing to ride with other users (e.g., ridesharing). The server computing devices 410 may store this information as a routine for the user with the user's account information in the storage system 450. In this regard, the routine may be considered "established."

Figure 11:
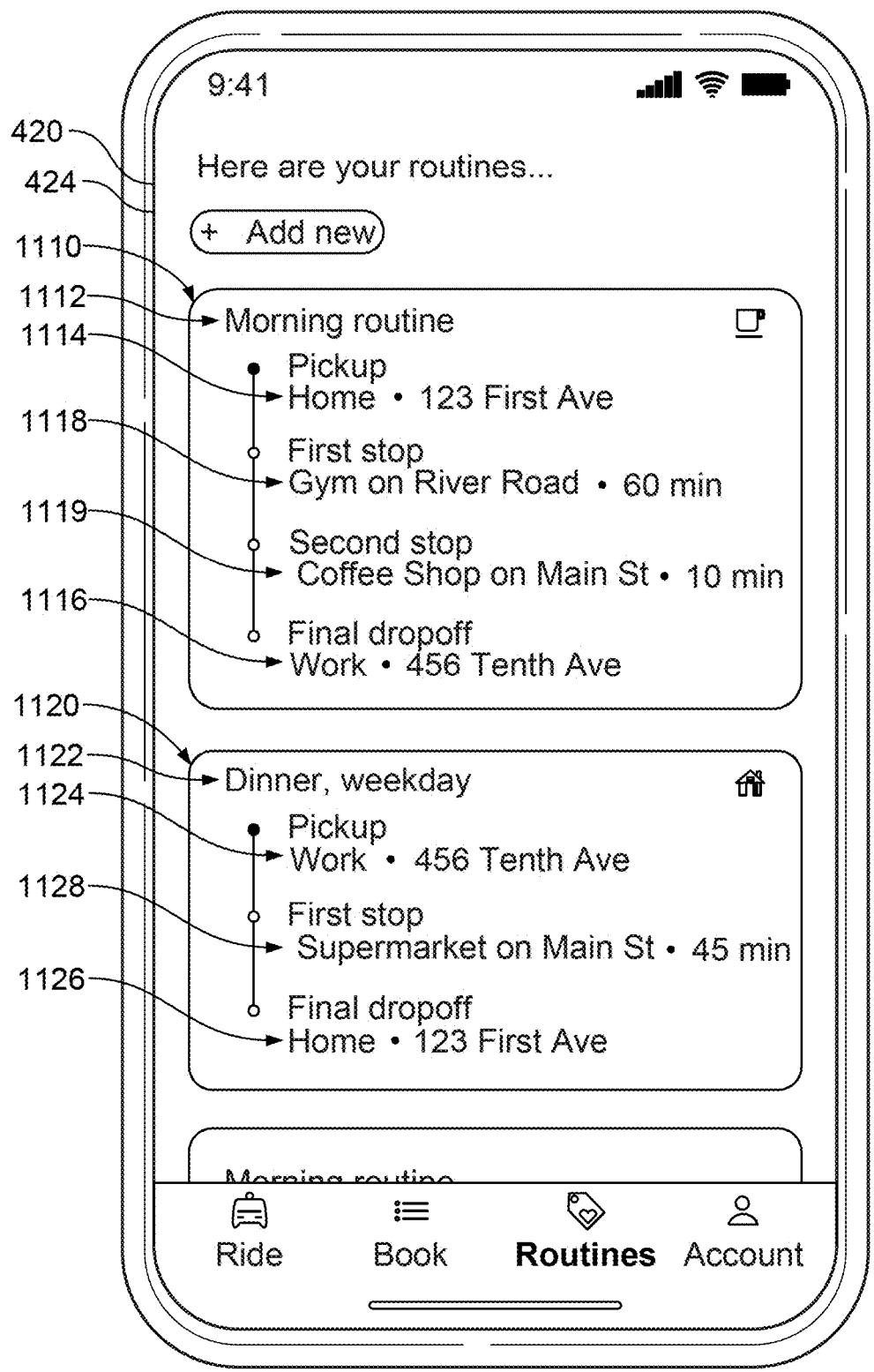
FIG. 11 is an example of a client computing device and a screen shot in accordance with aspects of the disclosure.

Once a routine has been established, when the user accesses the application, for instance to request a new trip, the application on the user's client computing device, for example client computing device 420, may send a signal to the server computing devices 410. In response, the server computing devices 410 may access the user's account information and send a set of one or more routines for display to the user. This may allow the user to select one of the routines in order to request that the server computing devices 410 set up a new trip based on the routine. FIG. 11 is an example of client computing device 420 and a screen shot including a set of routines 1110, 1120. In this example, each routine includes a timing characteristic 1112, 1122 (e.g., "morning" and "dinner, weekday"), as well as a pickup location 1114, 1124, a final destination 1116, 1126, and one or more intermediate destinations 1118, 1119, 1128.

In some instances, when a user selects a routine with an intermediate destination, the user may adjust whether the intermediate destination is to be a short errand stop (e.g., school drop off or coffee pickup) or a long errand stop (e.g., shopping at a store or eating at a restaurant). For example, based on the last trip or information input by the user when setting up the routine, any intermediate stops may be classified as short errand stops or long errand stops. When selecting a routine, the user may be enabled to confirm these classifications, change them, or even change an amount of time for a long errand stop (e.g., 15 minutes to 1 hour, etc.).

In some instances, the set of routines may be displayed using the time characteristic. For example, the set of routines may identify which routines are morning routines and which routines are evening routines and this information may be displayed with each routine. Alternatively, depending upon the current time of day, the server computing devices may send different sets of routines. For example, in the morning, the server computing device may send a set of routines with a morning time characteristic, and in the evening, the server computing devices may send a set of routines with an evening time characteristic. In addition, or alternatively, the sets of routines may be differentiated based on the day of the week (e.g., a set of weekday routines or a set of weekend routines), time of year, and so on. In this regard, when the user opens the application, the user's established routines may be provided as options for a new trip based on the time of day and/or day of the week. in some instances, longer timescale indicators such as calendar month, seasons (e.g., autumn, winter, spring, summer), or incremental day of the year ("2022 day #244"), may be used to help provide options. For example, commuting times may differ during winter as compared to summer, or during soccer season, etc.

Figure 12:
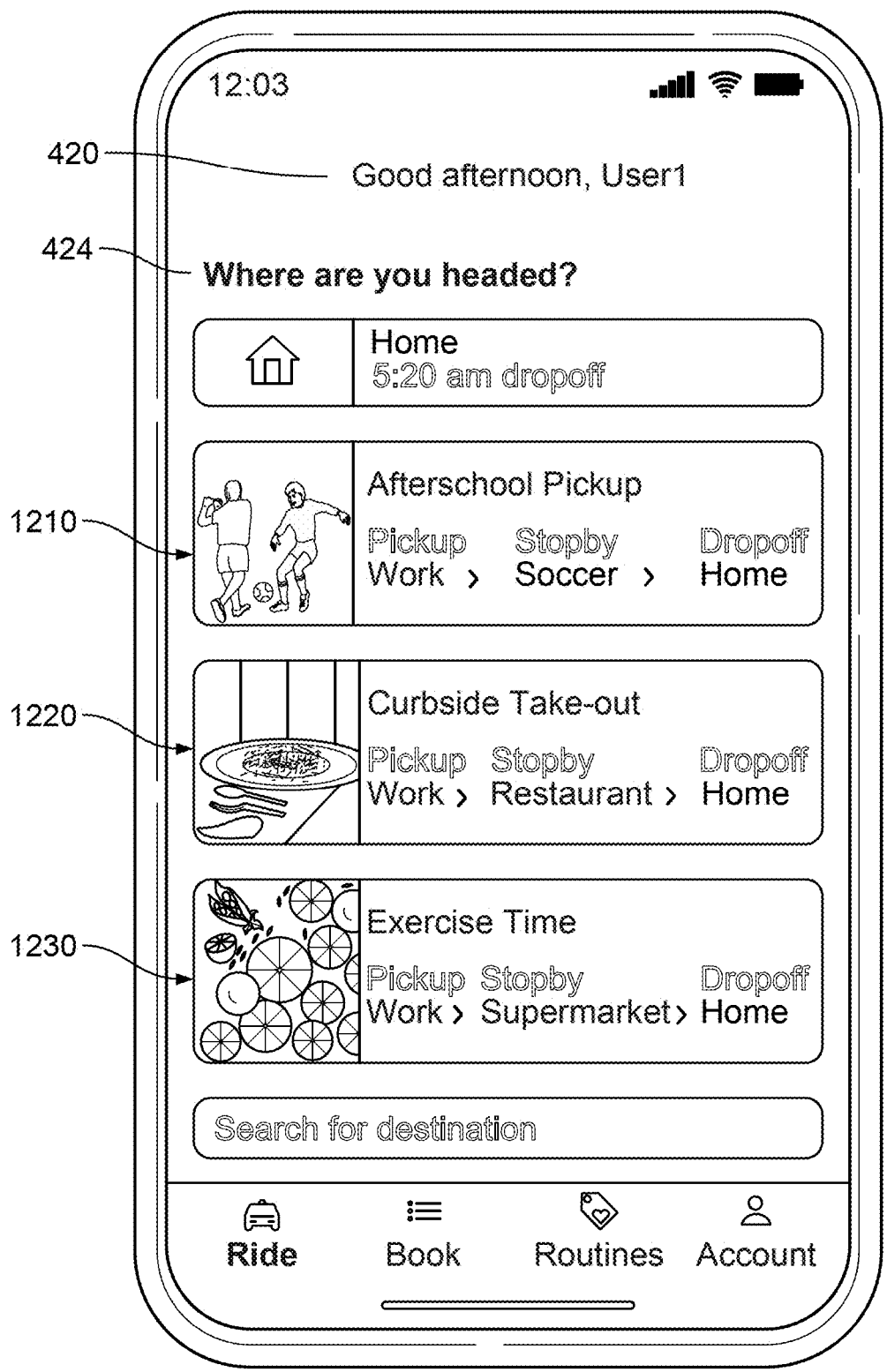
FIG. 12 is an example of a client computing device and a screen shot in accordance with aspects of the disclosure.
Figure 13:
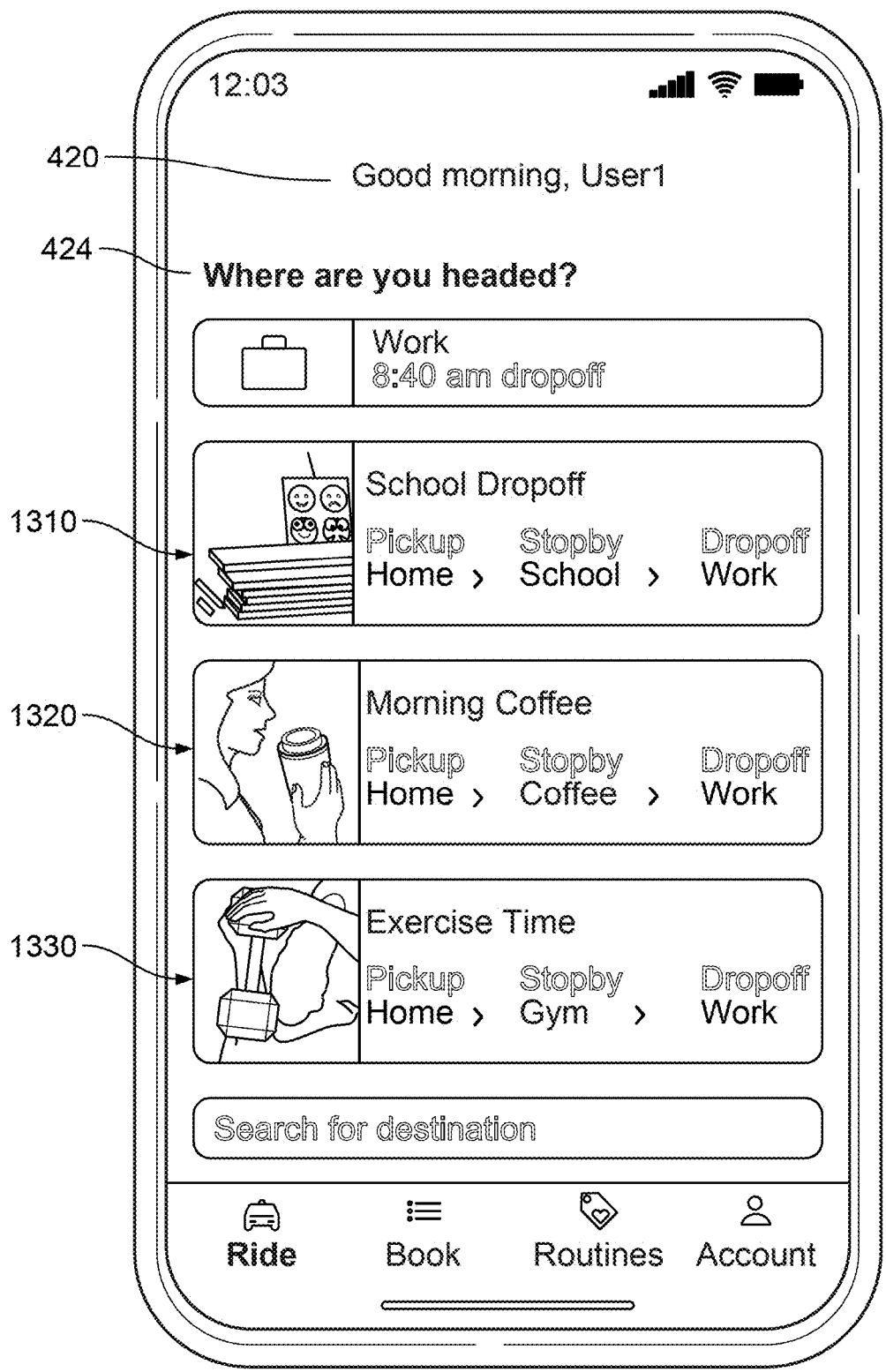
FIG. 13 is an example of a client computing device and a screen shot in accordance with aspects of the disclosure.

FIG. 12 is an example of client computing device 420 and a screen shot including a set of routines 1210, 1220, 1230 which may be displayed to a user (e.g., "User 1") during a period of time corresponding to afternoons. In this regard, this set of routines may be associated with a time characteristic of afternoons. FIG. 13 is an example of client computing device 420 and a screen shot including a set of routines 1310, 1320, 1330 which may be displayed to this same user during a period of time corresponding to mornings. In this regard, this set of routines may be associated with a time characteristic of mornings.

In addition, or alternatively, the routines may be provided as options for a new trip based on other information. For instance, if the user opts to share information with the application such as the user's calendar information, search or location history, etc. this information may be used by the server computing devices to determine which routines to include in the set. For example, if the user has been searching for a particular location or has an upcoming calendar entry with a particular location, this information may be used by the server computing devices to include one or more routines in the set that also include the particular locations. In this regard, the most relevant routines may be displayed to the user.

As another instance, the server computing devices may use real time traffic information as well as expected traffic conditions to determine whether it might make more sense to take a particular routine now as compared to according to the time characteristic for that particular routine. For example, if the user could potentially save at least some threshold amount of time or percentage of time (e.g., 10 minutes or 10% or more or less) by taking a particular routine now, the routine may be included in the set of routines. In addition, such routines may be displayed with an attribute explaining why the routine is being displayed (e.g., "Instead of going to the supermarket on Sunday, go now and save 12 minutes in traffic!").

The server computing devices may also provide sets of routines which provide benefits to transportation service. For example, the server computing devices may include routines that move the autonomous vehicles towards destinations which more evenly distribute the autonomous vehicles of a fleet of autonomous vehicles or which send autonomous vehicles of the fleet to certain locations at or near peak demand times in order to pre-position the autonomous vehicles. For instance, a fleet management system may determine that vehicles need to be distributed in a certain manner to minimize wait times across a city (e.g., during commute hours vehicles should be pre-positioned in business districts). To avoid sending empty vehicles, the fleet management system and/or a routines system may determine whether there are routines that could be suggested and/or executed that would result in moving some of the vehicles of a fleet to roughly the desired locations with passengers (rather than driving empty).

For instance, the server computing devices may predict the needs or demands on the transportation service (trip or delivery) on a periodic basis (e.g., hourly) using a large set of historic, current, future trip data (e.g., user sessions and demand, traffic, driving behavior, fleet availability). The server computing devices may then coordinate transportation services and other driving needs (e.g., mapping construction, evaluating road conditions, testing software, etc.) based on these predictions. The server computing devices may also attempt to balance services and other driving needs to optimize for a specific outcome, for example, the best estimated times of arrival for trips, fastest testing and qualification software, quickly remapping construction zones, and so on. Balancing these over time may thus require consideration of multiple different trip demand considerations, one of which may include suggesting routines to users, to increase or reduce demand, or increase/reduce vehicle supply, in specific areas at predictable times.

In some instances, if a user selects a routine, the server computing devices 410 may provide suggestions based on the user's trip history. For instance, if a user has defined a "Work commute" routine weekday mornings, the server computing devices may suggest other locations where the user has stopped in the past on weekday mornings either when traveling to work or elsewhere. In this regard, once a user has taken a trip to a particular location, when the user is arranging subsequent trips, the server computing devices may provide information in order to display notifications suggesting that the user add similar points of interest (e.g., other coffee shops, health food shops, restaurants, markets, etc.) based on the user's trip history or route that the trip will follow. In addition, the server computing devices may prioritize points of interest that are along the route or will not add too much additional time to the trip. In addition, the server computing devices may identify and provide suggestions on time of day, popular points of interest, nearby events (e.g., periodic local farmer's market or craft fair that's on or close to the route). For example, if the user typically stops for coffee on weekday mornings at "The Coffee Shop", the server computing devices may send information to enable the user's client computing device to display a notification suggesting that the user add a stop at The Coffee Shop to the selected routine. In some instances, users may be provided with an option to suppress location suggestions. This may be provided in the application and/or a display or other input device of the autonomous vehicle.

In some instances, if the user has provided a timing characteristic identifying when the user wants to arrive at the final destination of a routine, this timing characteristic may be used to identify what additional locations to suggest. For example, if the user selects the "Work commute" routine, and the user wants to arrive at the final destination of this routine by 9:30 am, the server computing devices 410 may send information to enable the user's client computing device to display a notification suggesting when the user should leave, e.g., "Leave now and get to work at 8:56 am OR leave now and stop by The Coffee Shop" for coffee and still get to work by 9:30 am."

In some instances, the application may also provide users with the ability to edit and delete routines. For instance, the user may be able to change intermediate or final destinations. For example, a user may be able to change a final destination for a work routine if the location of the user's work changes or if the user has a new favorite coffee shop location.

Once a user has selected and confirmed a routine, the server computing devices may then arrange a trip according to the routine. This may include selecting an autonomous vehicle for the trip (e.g., an available autonomous vehicle not otherwise providing trip or other services which is nearby to the user) and sending dispatching instructions to the autonomous vehicle.

The features described herein may enable users of an autonomous vehicle transportation service to recognize, save and utilize routines including those involving intermediate destinations. This may result in a more user-friendly and appealing experience with the transportation service and encourage future ridership while also providing greater flexibility and convenience in carrying out routine trips that someone using a personal vehicle may enjoy.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only some of many possible embodiments. Further, the same reference numbers in different drawings can identify the same or similar elements.

The invention claimed is:

1. A method of arranging trips for a fleet of autonomous vehicles, the method comprising:
    receiving, by one or more processors of one or more server computing devices of a fleet management system in communication with the fleet of autonomous vehicles, a request for a first trip for a user from a client computing device, the request including a first pickup location for the first trip and a destination location for the first trip;
    determining, by the one or more processors, that the user has previously completed a second trip from a second pickup location to the destination location, wherein the second pickup location is different from the first pickup location;
    responsive to determining that the second pickup location is within a predetermined distance of the first pickup location, providing, by the one or more processors, for display to the user, a notification suggesting that the user establish a routine from the first pickup location or the second pickup location to the destination location;
    receiving, by the one or more processors, confirmation that the user wants to establish the routine;
    responsive to receiving the confirmation, generating and storing, by the one or more processors, the routine in memory accessible by the one or more processors; and
    sending, by the one or more processors, dispatching instructions to an autonomous vehicle of the fleet of autonomous vehicles in order to cause the autonomous vehicle to pick up the user at the first pickup location and transport the user to the destination location according to the request.

2. The method of claim 1, further comprising receiving an intermediate destination for the first trip, and wherein the notification further suggests that the user establish the routine based on the intermediate destination.

3. The method of claim 1, wherein the notification is provided to the client computing device for display.

4. The method of claim 1, wherein the notification is provided to the autonomous vehicle for display.

5. The method of claim 4, wherein the notification is provided with a timing requirement defining when the notification is to be displayed during the first trip.

6. The method of claim 5, wherein the timing requirement indicates that the notification is to be displayed after the user is within the autonomous vehicle and indicates that the first trip can start.

7. The method of claim 5, wherein the timing requirement indicates that the notification is to be displayed when the autonomous vehicle is stopped.

8. The method of claim 5, wherein the timing requirement indicates that the notification is to be displayed when the user engages with a display of the autonomous vehicle during the first trip.

9. The method of claim 1, further comprising, identifying a timing characteristic for the routine based on the request and the second trip.

10. The method of claim 9, wherein identifying the timing characteristic is based on a current time of day associated with receiving the request and the second trip.

11. The method of claim 9, wherein identifying the timing characteristic for the routine is based on user input at the client computing device.

12. The method of claim 9, further comprising, subsequent to generating and storing the routine, providing the routine for display to the user as a suggestion for third trip based on the timing characteristic.

13. The method of claim 12, wherein the timing characteristic for the routine indicates a time of day for the routine.

14. The method of claim 9, wherein identifying the timing characteristic for the routine includes comparing, by the one or more processors, a first time of day for the first trip to a second time of day for the second trip.

15. The method of claim 14, wherein:
    comparing the first time of day to the second time of day includes determining, by the one or more processors, whether the first time of day and the second time of day are a same time of day; and
    providing the notification suggesting that the user establish the routine is further based on determining that the first time of day and the second time of day are the same time of day.

16. The method of claim 9, wherein identifying the timing characteristic for the routine includes comparing, by the one or more processors, a first day for the first trip to a second day for the second trip, wherein providing the notification suggesting that the user establish the routine is further based on comparing the first day to the second day.

17. The method of claim 16, wherein:
    comparing the first day to the second day includes determining, by the one or more processors, whether the first day and the second day are a same day; and
    providing the notification suggesting that the user establish the routine is further based on determining that the first day and the second day are the same day.

18. The method of claim 1, further comprising, subsequent to completion of the first trip:
    receiving, by the one or more processors from the client computing device, a signal indicative of access of a transportation service application associated with the fleet management system;
    responsive to receiving the signal, identifying, by the one or more processors, a plurality of routines stored in the memory and associated account information for the user, the plurality of routines including the routine; and
    providing the plurality of routines to the client computing device for display as a suggestion for a third trip.

19. The method of claim 18, further comprising:
    receiving, by the one or more processors from the client computing device, another signal indicative of selection of the routine; and
    responsive to receiving the other signal, sending, by the one or more processors, other dispatching instructions to one or more autonomous vehicles of the fleet of autonomous vehicles associated with the routine.

20. A system for arranging trips for a fleet of autonomous vehicles, the system comprising one or more processors of one or more server computing devices of a fleet management system in communication with the fleet of autonomous vehicles, the one or more processors being configured to:
    receive a request for a first trip for a user from a client computing device, the request including a first pickup location for the first trip and a destination location for the first trip;

determine that the user has previously completed a second trip from a second pickup location to the destination location, wherein the second pickup location is different from the first pickup location;

responsive to a determination the second pickup location is within a predetermined distance of the first pickup location, provide, for display to the user, a notification suggesting that the user establish a routine from the first pickup location or the second pickup location to the destination location;

receive confirmation that the user wants to establish the routine;

responsive to receipt of the confirmation, generate and store the routine in memory accessible by the one or more processors; and send dispatching instructions to an autonomous vehicle of the fleet of autonomous vehicles in order to cause the autonomous vehicle to pick up the user at the first pickup location and transport the user to the destination location according to the request.

* * * * *